(12) United States Patent  (10) Patent No.: US 7,796,331 B2
Mizushima et al.  (45) Date of Patent: Sep. 14, 2010

(54) LASER IMAGE DISPLAY DEVICE AND LASER IMAGE DISPLAY SCREEN

(75) Inventors: Tetsuro Mizushima, Osaka (JP); Ken'ichi Kasazumi, Osaka (JP); Tomoya Sugita, Osaka (JP)

(73) Assignee: Panasonic Corporation, Osaka (JP)

( * ) Notice: Subject to any disclaimer, the term of this patent is extended or adjusted under 35 U.S.C. 154(b) by 261 days.

(21) Appl. No.: 11/914,694

(22) PCT Filed: May 15, 2006

(86) PCT No.: PCT/JP2006/309662
§ 371 (c)(1), (2), (4) Date: Nov. 16, 2007

(87) PCT Pub. No.: WO2006/123613
PCT Pub. Date: Nov. 23, 2006

(65) Prior Publication Data
US 2009/0103176 A1    Apr. 23, 2009

(30) Foreign Application Priority Data
May 17, 2005   (JP) .............................. 2005-143751

(51) Int. Cl.
*G03B 21/56*   (2006.01)
(52) U.S. Cl. ..................................... 359/449
(58) Field of Classification Search ................. 359/443, 359/449, 452–453, 459, 460
See application file for complete search history.

(56) References Cited

U.S. PATENT DOCUMENTS

| 3,893,748 | A | * | 7/1975 | De Palma et al. | ........... | 359/455 |
| 5,668,662 | A | * | 9/1997 | Magocs et al. | ............... | 359/452 |
| 7,416,306 | B2 | * | 8/2008 | Yamamoto et al. | ............ | 353/31 |
| 7,535,636 | B2 | * | 5/2009 | Lippey et al. | ............... | 359/443 |

FOREIGN PATENT DOCUMENTS

| JP | 28-4263 | | 5/1953 |
| JP | 55-65940 | | 5/1980 |
| JP | 5-173094 | | 7/1993 |
| JP | 06266011 A | * | 9/1994 |
| JP | 2737093 | | 4/1998 |
| JP | 2003-98601 | | 4/2003 |

(Continued)

OTHER PUBLICATIONS

Machine translation of JP170959 (2004).*

(Continued)

*Primary Examiner*—Christopher Mahoney
(74) *Attorney, Agent, or Firm*—Wenderoth, Lind & Ponack, L.L.P.

(57) ABSTRACT

A laser image display device and a laser image display screen used for the laser image display device. The laser image display device is provided with a laser light source for emitting laser beams and a laser image display screen (10) for projecting the laser beams. The laser image display screen (10) is provided with a reflection scattering body (11) for scatter reflecting the laser beams, and a semi-transmissive diffusion layer (12) arranged substantially parallel to the reflection scattering body (11). The semi-transmissive diffusion layer (12) reflects at least a part of the laser beams, transmits the rest, diffuses the transmitting laser beams and projects them.

6 Claims, 12 Drawing Sheets

FOREIGN PATENT DOCUMENTS

JP            2004-170959       6/2004

OTHER PUBLICATIONS

Machine translation of JP5173094 (1993).*
Machine Translation of JP 2737093 (Apr. 1998).*

Patent Cooperation Treaty (PCT) International Preliminary Report on Patentability in corresponding International Application No. PCT/JP2006/309662.

International Search Report issued Aug. 1, 2006 in the International (PCT) Application of which the present application is the U.S. National Stage, PCT/JP/2006/309662.

* cited by examiner

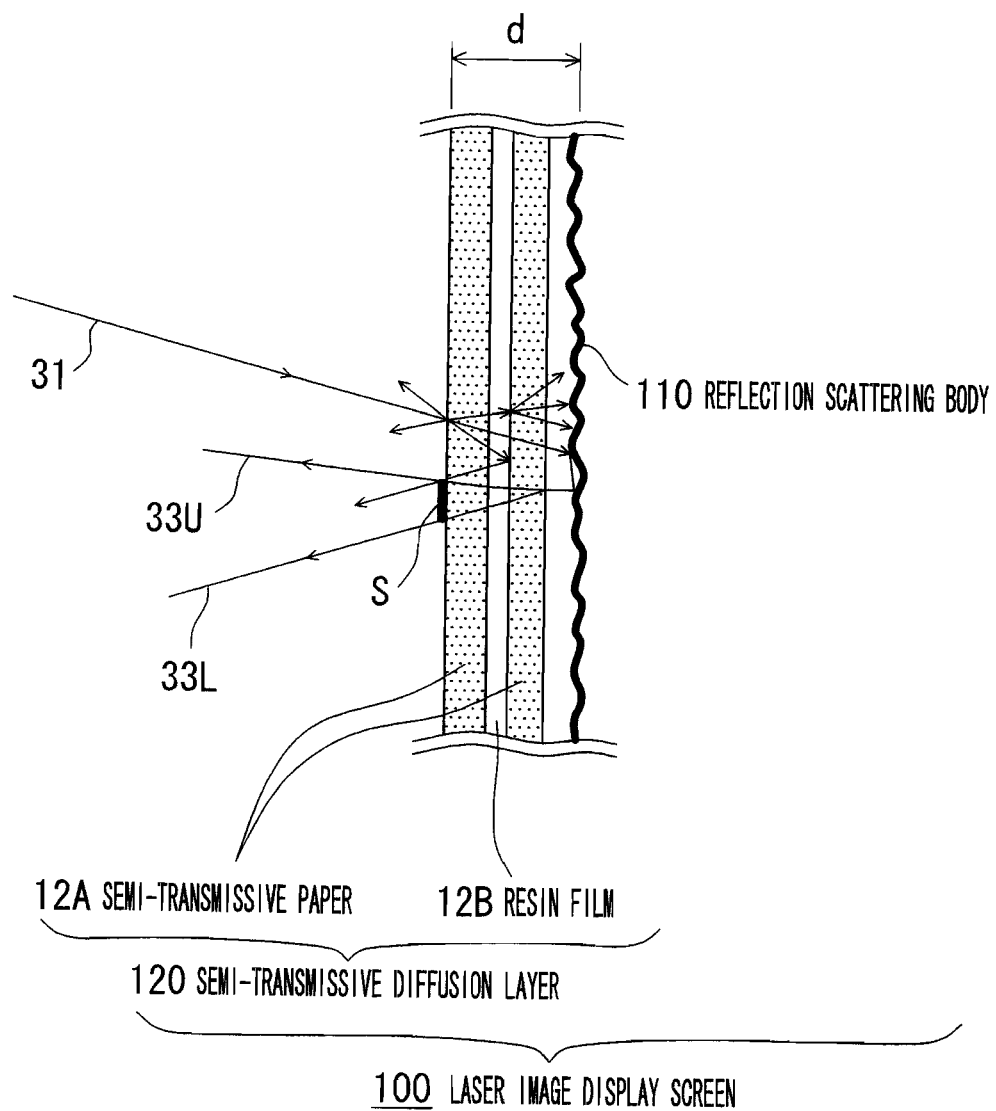

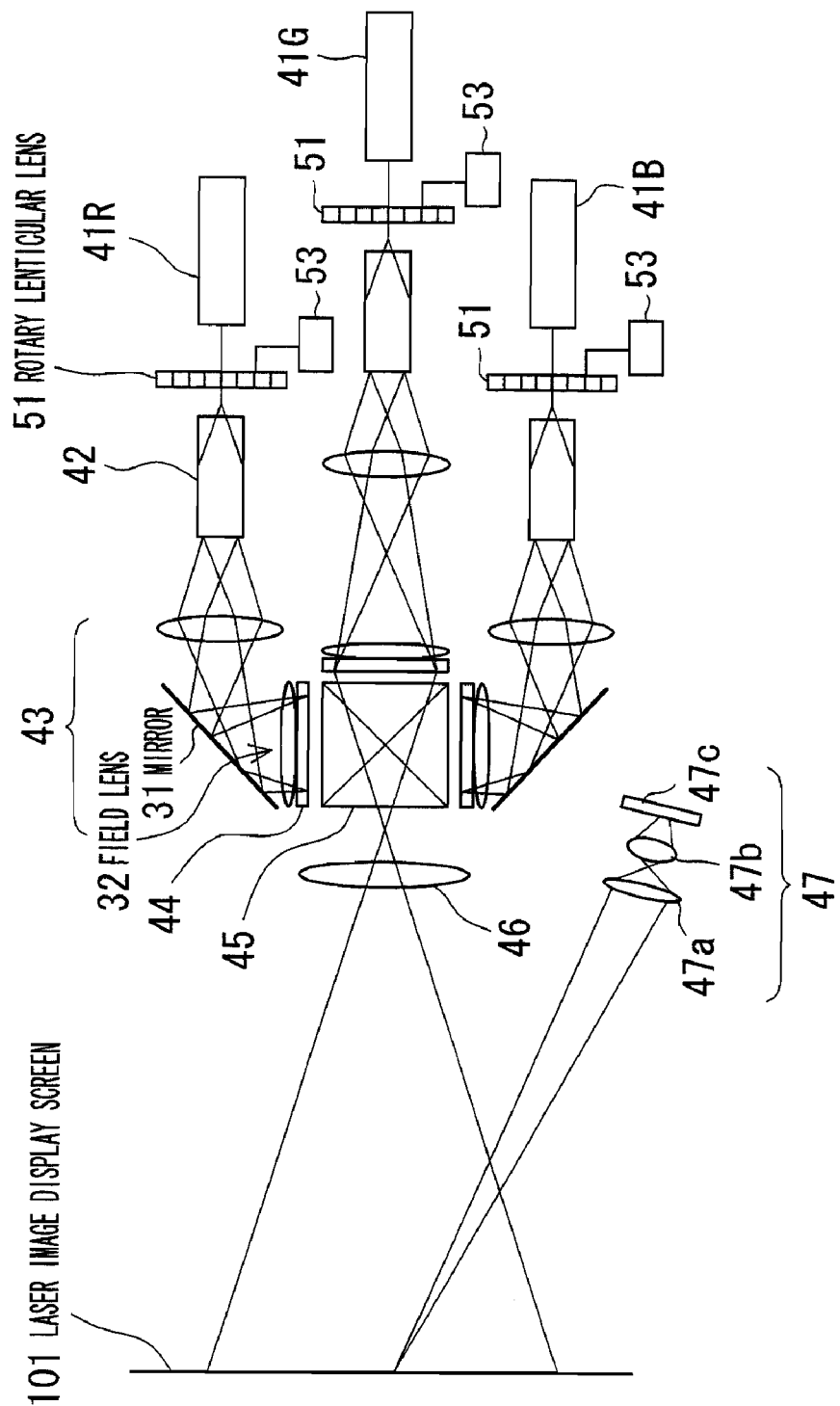

81 RED LASER LIGHT SOURCE

WAVELENGTH (nm)
CENTER WAVELENGTH 634.8nm
FWHM($\Delta \lambda_R$) 1.9nm

WAVELENGTH (nm)
CENTER WAVELENGTH 540.2nm
FWHM($\Delta \lambda_G$) 1.2nm

WAVELENGTH (nm)
CENTER WAVELENGTH 445.0nm
FWHM($\Delta \lambda_B$) 2.9nm

LASER IMAGE DISPLAY DEVICE AND LASER IMAGE DISPLAY SCREEN

BACKGROUND OF THE INVENTION

1. Technical Field

The present invention relates to an image display device or a device for displaying images, and an image display screen thereof. In particular, the present invention relates to a laser image display device for forming an image using a laser light source as a light source, and a laser image display screen used with the laser image display device.

2. Description of the Related Art

Image display devices using various methods are currently being used widely. One of the image display methods used in such various image display devices is a projection display method in which light from a modulated light source is projected onto a screen and an image is displayed. Conventionally, the light source employed in the image display device using such method is a lamp light source. However, the lamp light source has problems in a short lifetime, a limited color reproduction region, and low light use efficiency.

In order to solve the problems in the lamp light source, a laser light source is recently being tested for use as a light source of the projection display. In this application, the image display device using the laser light source as the light source is referred to as the laser image display device, and similarly, the screen for displaying the image using the laser light source as the light source is referred to as the laser image display screen. The laser light source of the laser image display device has a longer lifetime than the lamp light source, and is easy to enhance the light use efficiency due to a strong directivity of the laser light. Furthermore, the laser light emitted by the laser light source excels in monochromaticity, enlarges the color reproduction region compared to the lamp light source, and enables a colorful image display.

However, the laser image display device has a problem of a speckle noise. The speckle noise is a noise caused by a high coherency of the laser light used in the image display. Such problem has not existed in the image display device that uses the lamp light source. When the laser light having high coherency is scattered on the screen and reaches an observer, the scattered laser light interfere with each other and the observer recognizes a microscopic uneven noise. Various techniques related to the laser image screen and the laser image display device for reducing the speckle noise have been proposed.

Japanese Laid-Open Patent Publication No. 55-65940 discloses a method of removing the speckle noise by vibrating the laser image display screen. However, a driving unit for vibrating the laser image display screen must be large when adopting such method for the large laser image display screen, and thus the volume of the driving unit and the power consumption increase.

Japanese Laid-Open Patent Publication No. 2003-98601 discloses a laser image display screen that may be used in a rear projection type laser image display device of projecting the image from a rear surface of the laser image display screen which is a side opposite to the observer and providing the image to the observer by transmitted laser light. The laser image display screen disclosed in JP 2003-98601 reduces the speckle noise with using a configuration which includes two types of light diffusion plate.

FIG. 1 is a schematic view of the laser image display screen disclosed in JP 2003-98601. The laser image display screen includes first and second diffusion plates 28a and 29b. This figure is a view describing a light path length difference provided by the laser image display screen with respect to two laser beams 25 and 27 that enter the first diffusion plate 29a at the same angle, transmit therethrough, and reach one region of the retina considered the same in recognition of an observer V. The laser light entering the first light diffusion layer 29a is diffused by the first diffusion plate 29a and propagated in various directions. At least a part of the laser light having exited the first light diffusion layer 29a is further entered to the second light diffusion layer 29b, diffused, and exits the layer and reaches the observer V. This screen is a laser image display screen for the rear projection type laser image display device that aims to reduce the speckle noise by using two diffusion plates 29a and 29b having different diffusion effects.

When using such screen for the laser image display screen, an infinite number of laser beams that diffuse in various directions exit the screen. The infinite number of laser beams includes the laser beams 25 and 27. The laser beams 25 and 27 enter the first diffusion plate 29a at the same incident angle from a right side of the figure. The laser beam 25 exits the first diffusion plate 29a at an angle of $\theta$ with respect to the main surfaces of the diffusion plates 29a and 29b due to a diffusion effect of the first diffusion plate 29a, and then enters the second diffusion plate 29b, at where the path is returned to the same direction as the incident angle with respect to the first diffusion plate 29a due to a diffusion effect of the second diffusion plate 29b, and reaches the eye of the observer V. On the other hand, the laser beam 27 enters the first diffusion plate 29 at the same incident angle as the laser beam 25, transmits the first and second diffusion plates 29a and 29b through the path of the same direction as that of the path when the laser beam 27 entered the plate, exits the plate and reaches the eye of the observer V.

The light path length difference of the laser beam 25 and the laser beam 27 is approximated as $$T((1/\cos\theta)-1)$$

where T is a distance between the first diffusion plate 29a and the second diffusion plate 29b.

$\theta$ is the diffusion angle of the first diffusion layer 29a. As $\theta$ approaches zero, the laser beams 25 and 27 strongly interfere with each other at the retina of the observer V. In this case, the light path length difference gradually approaches zero. Thus, the speckle noise that may be recognized by the observer V still has strong intensity.

In JP 2003-98601, no description related to problems such as a multiple reflection and the like of the laser light by the two types of light diffusion plates which is assumed to be arisen is made.

It is impossible to use the laser image display screen disclosed in JP 2003-98601 for a front projection type laser image display device, which projects the image from the same side as the observer, that is, a front surface of the laser image display screen and provides the image to the observer by reflected laser light.

The method disclosed in JP 55-65940 is applicable to the front projection type laser image display device. However, the method disclosed in JP 55-65940 is difficult to implement on the large laser image display screen for displaying large images, as mentioned above.

SUMMARY OF THE INVENTION

In view of the above problems, the present invention aims to provide a laser image display device capable of providing an observer an image having an arbitrary size as a colorful and high quality image with a speckle noise removed or at least reduced, and a laser image display screen for the same.

In one aspect, the present invention provides, a laser image display screen for projecting laser light, the laser image display screen that includes: a reflection scattering body which scatters and reflects the laser light; and a semi-transmissive diffusion layer arranged substantially parallel to the reflection scattering body, wherein the semi-transmissive diffusion layer reflects at least a part of the laser light, and transmits the remaining laser light, and diffuses and outputs the transmitting laser light.

In one aspect of the present invention, a distance between a boundary on a side opposite to the reflection scattering body of the semi-transmissive diffusion layer and the reflection scattering body is preferably greater than or equal to 50 micrometers and less than or equal to 2 millimeters.

In one aspect of the present invention, the semi-transmissive diffusion layer preferably includes paper material.

In another aspect, the present invention provides a laser image display device that includes: a laser light source which emits a laser light; and a laser image display screen which projects the laser light, wherein the laser image display screen includes: a reflection scattering body which scatters and reflects the laser light; and a semi-transmissive diffusion layer arranged substantially parallel to the reflection scattering body, wherein the semi-transmissive diffusion layer reflects at least a part of the laser light, and transmits the remaining laser light, and diffuses and outputs the transmitting laser light.

In another aspect of the present invention, a light deflecting element which receives the laser light and outputs the laser light while deflecting an advancing direction is preferably further arranged between the laser light source and the laser image display screen.

In another aspect of the present invention, a relationship of a distance d between a boundary on a side opposite to the reflection scattering body of the semi-transmissive diffusion layer and the reflection scattering body, a center wavelength $\lambda$ of the laser light emitted by the laser light, and a half value width $\Delta\lambda$ of the laser light preferably satisfies $2d \times \lambda < \lambda^2$.

The laser image display device and the laser image display screen thereof according to the present invention are inexpensive and can homologize to image display of an arbitrary size, and can display colorful and high quality image in which the speckle noise is removed or at least reduced.

BRIEF DESCRIPTION OF THE DRAWINGS

FIG. 3 is a partial cross sectional schematic view of a variation of the screen according to the first embodiment of the present invention.

FIG. 6 is a schematic diagram of a laser image display device according to a third embodiment of the present invention and an image evaluation device.

EXPLANATIONS OF LETTERS OR REFERENCE NUMERALS

Figure 1:
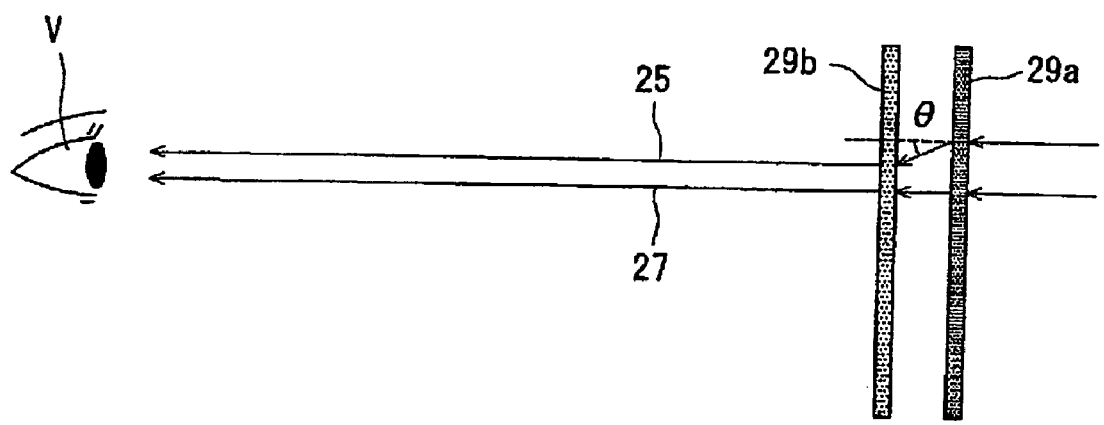
FIG. 1 is a diagram of a light path length difference provided to the laser light by a laser image display screen of JP 2003-98601.

10, 100, 101 laser image display screen
11, 110 reflection scattering body
2, 120 semi-transmissive diffusion layer
12A, 12C semi-transmissive paper
12B, 13 resin film
41R red laser light source
41G green laser light source
41B blue laser light source
42 rod integrator
43 illumination optical system
44 spatial light modulation element
46 projection lens
47 vision camera
51 rotary lenticular lens
51a variation of rotary lenticular lens
53 driving unit
71 lenticular lens element
71a variation of lenticular lens element
81 red laser light source
83 laser diode chip array
85 fiber
87 multimode fiber
811 laser diode chip
812 laser diode chip
813 laser diode chip
814 laser diode chip
815 laser diode chip
816 laser diode chip
817 laser diode chip
818 laser diode chip

DETAILED DESCRIPTION OF THE PREFERRED EMBODIMENTS

The embodiment of the present invention will now be described with reference to the accompanying drawings.

First Embodiment

Figure 2A:
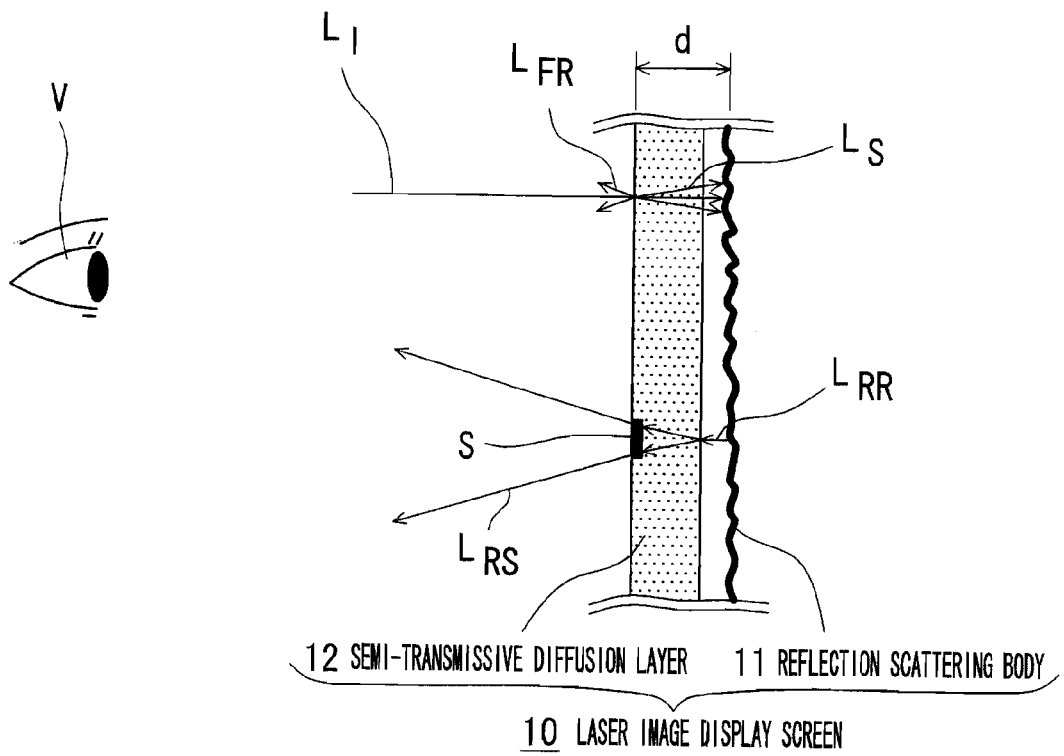
FIG. 2A is a partial cross sectional schematic view of a screen according to a first embodiment of the present invention.

A first embodiment according to the present invention relates to a laser image display screen used in the front projection type laser image display device. FIG. 2A is a partial cross sectional schematic view of a laser image display screen 10 according to the first embodiment. The laser image display screen 10 includes a reflection scattering body 11 and a semi-transmissive diffusion layer 12. In the following description, "laser image display screen" is referred to simply as "screen".

The laser image display device forms an image by modulating the laser light emitted by a laser light source. In a front projection type laser image display device, a laser light forming the image is projected onto a front surface of the screen 10, that is, onto the screen 10 on an observer V side.

The semi-transmissive diffusion layer 12 reflects at least a part of an incident light LI (laser light configuring the image) at a boundary on the observer V side, and transmits the remaining light. The reflection at the observer V side is a scattered reflection (also referred to as diffused reflection) as indicated with a front surface scattered and reflected light LFR in FIG. 2A, and the transmitted remaining laser light is diffused while transmitting through the semi-transmissive diffusion layer 12 as indicated with diffused light LS in FIG. 2A.

The reflection scattering body 11 scatters and reflects all or at least most of the laser light entering from the boundary on the semi-transmissive diffusion layer 12 side.

FIG. 2A shows the laser light reflected at the boundary on the semi-transmissive diffusion layer 12 side of the reflection scattering body 11 as an internally scattered and reflected light LRR. For the sake of simplifying the illustration, a light path of the internally scattered and reflected light LRR from the laser light source (not shown) to the reflection scattering body 11 is omitted. The internally scattered and reflected light LRR again enters the semi-transmissive diffusion layer 12 and is subjected to a diffusion effect while transmitting through the semi-transmissive diffusion layer 12. In the figure, the diffused internally scattered and reflected light LRR is referred to as an internally scattered, reflected, and diffused light LRS. The internally scattered, reflected, and diffused light LRS exits with a predetermined intensity distribution as divergent laser light from a microscopic area element S of the boundary on the observer V side of the semi-transmissive diffusion layer 12. The scattering reflection of the laser light by the reflection scattering body 11 is not limited to the scattering reflection in directions within the plane of drawing, and may be in various directions including directions towards outside the plane of the drawing.

A part of the laser light, which exits the laser light source (not shown) and reaches the semi-transmissive diffusion layer 12, is scattered and reflected at the boundary on the observer V side of the semi-transmissive diffusion layer 12 as with the front surface scattered and reflected light LFR, and the remaining laser light is entered to the semi-transmissive diffusion layer 12, is diffused while transmitting, being scattered and reflected when reaching the reflection scattering body 11, again entered to the semi-transmissive diffusion layer 12, is diffused while transmitting, and exits from the boundary on the observer V side of the semi-transmissive diffusion layer 12. Therefore, the screen 10 scatters and reflects the laser light configuring the image with at least two surfaces of the reflection scattering body 11 and the boundary on the observer V side of the semi-transmissive diffusion layer 12. The surface at where the laser light is reflected is not limited to two surfaces when realizing an object of the present invention. The present invention does not exclude laser image display screens having a configuration of reflecting the laser light at three or more surfaces for the laser light to reach the eye of the observer V.

The laser light being scattered and reflected at the reflection scattering body 11 towards the observer V is subjected to the diffusion effect by the semi-transmissive diffusion layer 12 on a light path (first half of the light path) from the laser light source to the reflection scattering body 11 and a light path (second half of the light path) from the reflection scattering body 11 to the observer V. In the first half of the light path, the semi-transmissive diffusion layer 12 is arranged, and thus the laser light entering the semi-transmissive diffusion layer 12 is diffused by the semi-transmissive diffusion layer 12, and entered to the boundary on the semi-transmissive diffusion layer 12 side of the reflection scattering body 11 in various angles compared to when the semi-transmissive diffusion layer is omitted. Therefore, the laser light subjected to modulation by an arbitrary unit (one pixel) of a minimum modulation unit (e.g., pixel contained in the modulation device) of the modulation for image formation by the laser light reaches the reflection scattering body 11 at various incident angles. In other words, a coherent laser light being proximate in space enters the reflection scattering body 11 in various angles, the distribution of the reflection angle of the laser light by the reflection scattering body 11 includes a greater number of angles, that is, a more advanced diversification is provided, whereby a light path length of the scattered and reflected light to the observer V can be differed. Therefore, interference at a retina of the observer V between the scattered and reflected light can be prevented.

The reflection scattering body 11 has an effect of greatly and nonlinearly changing a direction of reflecting the laser light by a slight difference in either or both a position the laser light enters or the incident angle. As described above, the laser light modulated by one arbitrary modulation unit can reach the reflection scattering body 11 at various incident angles due to the diffusion effect of the semi-transmissive diffusion layer 12 in the first half of the light path. Compared to when the semi-transmissive diffusion layer 12 is omitted, the scattering effect by the reflection scattering body 11 can be more reliably and effectively provided to the laser light by the effect of the semi-transmissive diffusion layer 12.

The diffusion effect on the laser light by the semi-transmissive diffusion layer 12 in the last half of the light path prevents the laser light (e.g., internally scattered and reflected light LRR) scattered and reflected by the reflection scattering body 11 from directly reaching the observer V.

In the last half of the light path, the internally scattered and reflected light LRR, for example, is subjected to the diffusion effect of the semi-transmissive diffusion layer 12 (e.g., as shown with internally scattered, reflected, and diffused light LRS), and an effective light source area increases. The effective light source area being referred to herein is an area of the light source image recognized by the observer V. The interference of light generally lowers as the light source area increases. Thus, the speckle noise can be reduced by increasing the effective light source area.

For instance, the internally scattered and reflected light LRR having exited from one point of the reflection scattering body 11 changes to the internally scattered, reflected, and diffused light LRS having an effective light source area of the microscopic area element S with respect to the observer V by the semi-transmissive diffusion layer 12.

Generally, the speckle noise is generated when the coherent light is scattered and entered to the eye of a human, and reaching one point on the retina of the human by way of different paths and interfering with each other. The screen 10 according to the present invention reduces the speckle noise recognized by the observer V by increasing the effective light source area of the laser light with respect to the observer V and reducing a coherency of the laser light. Among the laser light having exited the laser light source, the presence of laser light which is reflected by the semi-transmissive diffusion layer 12 and reaches the observer V (not shown) also contributes to reducing coherency of the laser light. The laser light reflected towards the observer V by the semi-transmissive diffusion layer 12 (without reaching the reflection scattering body 11) reaches the observer V along with the laser light reflected by the reflection scattering body 11 and reaching the observer V. Thus, the effective light source area with respect to the observer V has an area larger than the microscopic area element S described above, and thus further enhances the speckle noise reducing effect. Therefore, the screen 10 has an effect of removing the speckle noise recognized by the observer V.

Figure 2B:
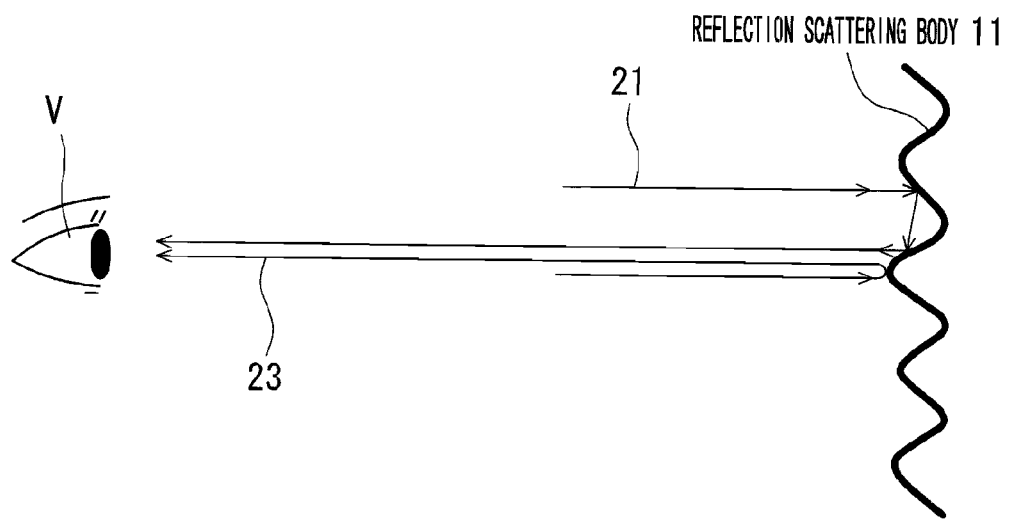
FIG. 2B is a diagram of a light path length difference provided to laser light by the screen of the present invention.

FIG. 2B is a view describing the light path length difference provided by the reflection scattering body 11 of the screen 10 with respect to two laser beams 21 and 23 that enter at positions very close to each other on the reflection scattering body 11 at the same angle and are then reflected. The reflected beams reach one region on the retina considered the same in terms of recognition of the observer V. The semi-transmissive diffusion layer 12 of the screen 10 is omitted in the figure for the sake of simplifying the description.

As described above, the speckle noise is generated when the scattered light interfere on the retina of the observer V. In this case, the contrast of the speckle noise changes by a light path length difference between the scattered light that interfere with each other. The stronger contrast of the interfered light becomes, the smaller the light path length difference becomes. And, hence the speckle noise recognized by the observer V increases. On the other hand, the larger the light path length difference becomes, the extremely weaker the contrast of the interfered light becomes, and the observer is less likely to recognize such interfered light as speckle noise. With reference to FIG. 2B, the laser beams 21 and 23 enter two different points on the reflection scattering body 11 having a concave-convex shape. The laser beam 21 enters a slope portion of the concave-convex shape (coupled waves shape) of the reflection scattering body 11, that is, a portion connecting an apex and an adjacent apex and having an inclination with respect to a main surface of the reflection scattering body 11 in macroscopic point of view, and the laser beam 23 enters an apex of the concave-convex shape (coupled waves shape), that is, a portion having an inclination with respect to the main surface of the reflection scattering body 11 of zero or substantially zero in macroscopic point of view. The laser beam 21 which enters the slope portion is reflected at one point of the slope portion and again reflected at one point of the adjacent slope portion, and reaches the eye of the observer V. On the other hand, the laser beam 23 is reflected at one point of the apex, to which it has entered, and reaches the eye of the observer V. The intensity of the interfered light recognized by the observer V becomes very small since the reflection scattering body 11 provides a light path length difference that is sufficiently large with respect to a wavelength of the light between the laser beams 21 and 23.

As shown in FIG. 2B, the screen 10 according to the present invention provides laser light having a large light path length difference compared to the screen shown in FIG. 1 by the scattering reflection (diffused reflection) of the reflection scattering body 11 even for the laser light that exits from two proximate points on the screen by the reflection scattering body 11 and reaches the observer V at substantially the same angle. In the scattering reflection (see FIG. 2B) of the reflection scattering body 11, the laser lights which exit from two proximate points on the screen 10 at the same angle and reach the eye of the observer V pass a completely different path. Thus, a large light path length difference is obtained. Other than the reflecting the incident laser light, the reflection scattering body 11 has an effect of providing the light path length difference, which cannot be obtained in a conventional example, to the laser light entering proximate positions at the same angle.

The reflection scattering body 11 of the screen 10 according to the present invention has a concave-convex shape pattern (coupled waves shape pattern) as shown in FIG. 2B for the purpose of generating the scattering reflection. In regards to an arbitrary direction in the surface plane, the concave-convex shape pattern of the reflection scattering body 11 has a distance from an apex of the convex part (concave part) to the apex of the adjacent convex part (concave part) of a pitch of less than or equal to ten millimeters, more preferably, a pitch of less than or equal to one millimeter. A step difference between the projecting apex (apex of convex part) of the concave-convex shape and the projecting (depressed) apex (apex of concave part) on the opposite side is greater than or equal to one micrometer, preferably greater than or equal to ten micrometers, and more preferably greater than or equal to fifty micrometers. The concave-convex shape merely needs to be a shape for diffuse reflecting the incident light. The concave-convex shape desirably includes at least one of shapes formed by combining a plurality of waveforms or an intermittent shape, that is, a slope portion having an inclination of substantially perpendicular to the main surface of the reflection scattering body 11 in macroscopic point of view.

The reflection scattering body 11 merely needs to contain material for scattering reflecting the laser light. The reflection scattering body 11 may include a beads type screen or a mat type screen used in a projector using a general lamp light source. Furthermore, a screen containing material other than the above can also be used as long as the laser light configuring an image can be scattered and reflected. Therefore, the reflection scattering body 11 may contain materials such as paper material and wall material, or may have a rough surface configured including plastic, glass, metal, and the like.

The semi-transmissive diffusion layer 12 of the screen 10 according to present invention obtains a wide view angle compared to when only the reflection scattering body 11 is arranged due to the diffusion effect.

The semi-transmissive diffusion layer 12 contains material having diffusion effect at both boundary portions on the observer V side and the reflection scattering body 11 side, where the boundary on the observer V side of both boundaries has a diffusing surface in at least a part of it. The boundary on the reflection scattering body 11 side of the semi-transmissive diffusion layer 12 preferably has a diffusing surface.

In regards to the laser light to be used, the semi-transmissive diffusion layer 12 preferably has a ratio in which the laser light that has entered at least one of the boundaries exits from the other boundary, that is, a transmissivity of greater than or equal to 10%. If less than 10%, the laser light does not sufficiently reach the reflection scattering body 11, a luminance lowers, and the speckle noise reducing effect also becomes small, and thus is not desirable. In order to obtain a high screen luminance screen and a speckle noise reducing effect, the transmissivity of the semi-transmissive diffusion layer 12 is preferably greater than or equal to 30%. More preferably, the transmissivity of the semi-transmissive diffusion layer 12 is greater than or equal to 50%.

A haze value (cloudiness value) of the semi-transmissive diffusion layer 12 is preferably greater than or equal to 20%. More preferably, greater than or equal to 40%, and most preferably, greater than or equal to 60%.

A reflectivity of the semi-transmissive diffusion layer 12 is preferably greater than or equal to 3%. More preferably, greater than or equal to 10%, and most preferably greater than or equal to 20%.

The semi-transmissive diffusion layer 12 may be made of uniform material. Furthermore, the semi-transmissive diffusion layer 12 may have a multi-layer configuration including a plurality of diffusing surfaces. In the case of the multi-layer configuration, the material with a diffusing surface on a front and a back may be formed by stacking with an adhesive, resin film, and the like. If one of the boundaries of the semi-transmissive diffusion layer 12 forms a mirror surface with respect to the entering laser light, the boundary forming the mirror surface is desirably adhered to the reflection scattering body 11 using the adhesive having an index of refraction substantially equal to the transmissive diffusion layer 12 to prevent reflection of laser light by the mirror surface. Moreover, if the semi-transmissive diffusion layer 12 has a multi-layer configuration, the multi-layer configuration is desirably configured using similar adhesive to prevent a formation of the mirror surface between each layer.

The semi-transmissive diffusion layer 12 includes a diffusing surface on at least a part of the boundary. Thus, the semi-transmissive layer 12 removes an interference pattern noise of the multi-layer configuration by the surface reflected laser light and the reflected light by the reflection scattering body 11.

The semi-transmissive diffusion layer 12 and the reflection scattering body 11 can be adhered with various adhesives so that the screen 10 has an integrated configuration. It is also advantageous to maintain a space between the semi-transmissive diffusion layer 12 and the reflection scattering body 11 constant by adhering with the adhesive the semi-transmissive diffusion layer 12 and the reflection scattering body 11 with a resin film interposed in between. The reflection scattering body 11 is formed on the boundary on the side opposite to the observer V of the semi-transmissive diffusion layer 12, and the screen 10 of integrated configuration is formed.

When using material having a smooth surface such as resin film, the boundary (diffusing surface) of the semi-transmissive diffusion layer 12 and the reflection scattering body 11, and the resin film are preferably closely attached using the adhesive or the like having an index of refraction of substantially the same as the index of refraction of the material having the smooth surface. The interference pattern noise caused by reflection at the relevant surface is thus prevented even if resin film or the like is used.

A distance d between the boundary on the observer V side of the semi-transmissive diffusion layer 12 and the reflection scattering body is preferably greater than or equal to 50 micrometers and less than or equal to 2 millimeters. If it is smaller than 50 micrometers, the effective light source area (area corresponding to microscopic area element S in FIG. 2A) at the boundary on the observer V side of the semi-transmissive diffusion layer 12 does not become sufficiently large, whereby the speckle noise reducing effect becomes insufficient and thus the configuration is not desirable. If it is greater than 2 millimeters, the effective light source area becomes too large. In this case, the resolution of the image degrades, whereby the image observed by the observer v may be out of focus, and thus the configuration is not desirable. The speckle noise reducing effect is enhanced as the distance d becomes larger, but the degrading of image quality is inevitable. The distance d is more preferably less than or equal to 1 millimeter in order to reproduce the desirable high resolution image.

The proportion occupied by the semi-transmissive diffusion layer 12 of the distance d between the boundary on the observer V side of the semi-transmissive diffusion layer 12 and the reflection scattering body is preferably greater than or equal to 5%, and more preferably greater than or equal to 20%. That is, a thickness of the semi-transmissive diffusion layer 12 is preferably greater than or equal to 0.05×d, and more preferably greater than or equal to 0.20×d. A multiple scattering more easily occurs by increasing an occupying proportion of the semi-transmissive diffusion layer, which contributes to further reduction in speckle noise.

FIG. 3 shows a variation of the screen of the first embodiment. The screen 100 includes a semi-transmissive diffusion layer 120 having a stacked configuration including a semi-transmissive paper 12A and a resin film 12B, and a reflection scattering body 110 including a beads type screen 11A, where the semi-transmissive diffusion layer 120 and the reflection scattering body 110 are attached using the adhesive.

In the present variation 100 as well, the semi-transmissive diffusion layer 120 has a reflection effect and a diffusion effect with respect to transmitted light, and the reflection scattering body 110 has a scattering reflection effect with respect to incident light, similar to the screen 10. A part of the incident light 31 is reflected by the semi-transmissive diffusion layer 120, and the transmitted light is diffused and reaches the reflection scattering body 110. The reflection scattering body 110 scatters and reflects the transmitted light so as to again input the light into the semi-transmissive diffusion layer 120 and output the light from the microscopic area element S as substantially divergent light. Light 33U and 33L illustrate the light which exits in a substantially diverged form from the microscopic surface area S.

In the present variation, the semi-transmissive diffusion layer 120 preferably includes the semi-transmissive paper 12A at least. The semi-transmissive paper 12A can obtain front and back diffusing surfaces and realize an appropriate transmissivity. Furthermore, it is very advantageous in terms of cost as compared to manufacturing of special diffusion plate and lens. Paper material such as Japanese paper, tracing paper, and the like can be used as the semi-transmissive paper 12A.

Figure 4:
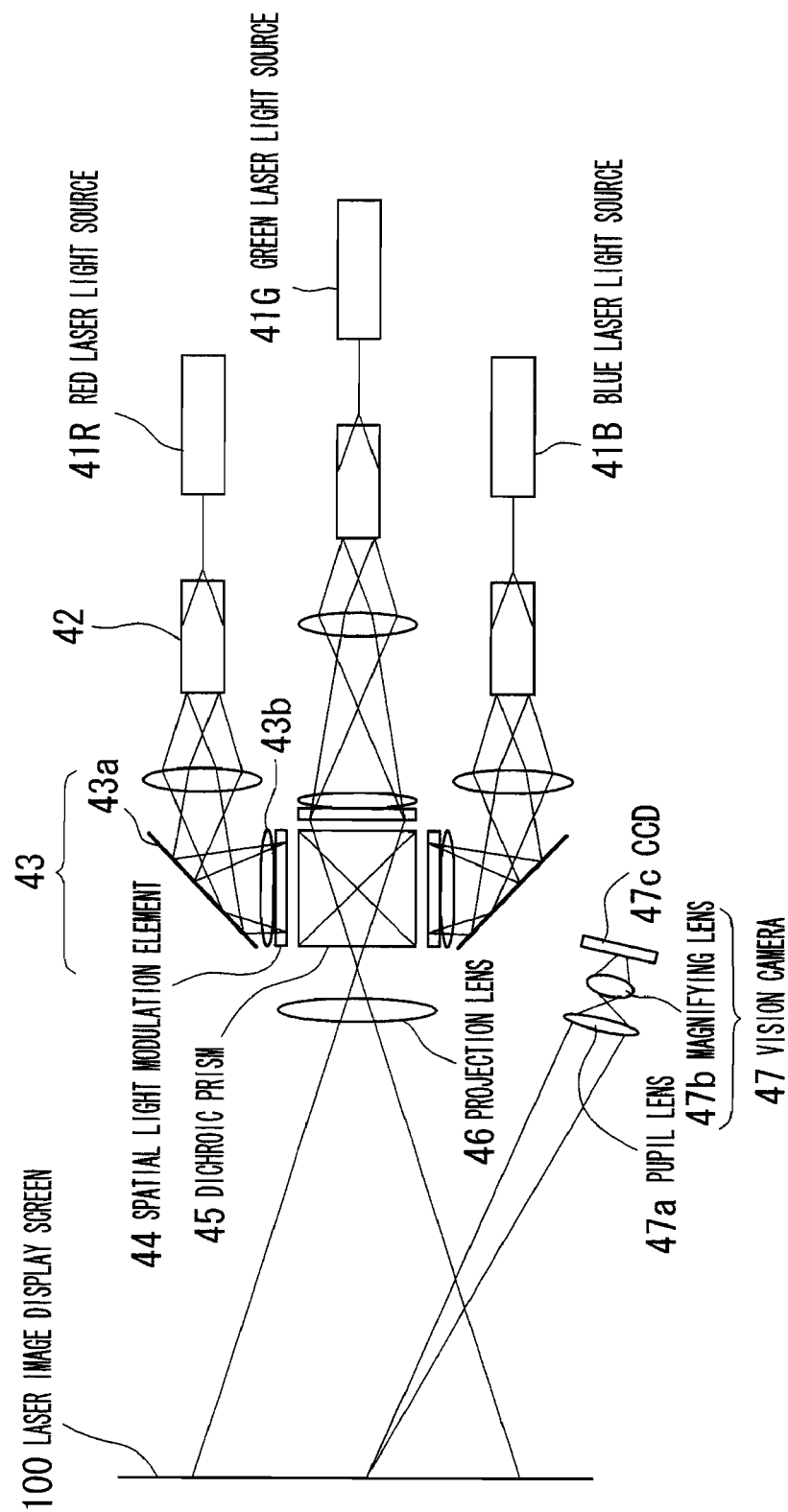
FIG. 4 is a schematic diagram of a laser image display device according to the first embodiment of the present invention and an image evaluation device.

The evaluation of the speckle noise reducing effect is performed with using the screen 100. FIG. 4 is a diagram of a laser image display device and a vision camera (view camera) 47 used for the evaluation and the screen 100. The laser image display device includes: laser light sources 41R, 41G, 41B of red, green, and blue; rod integrators 42; an illumination optical system 43; a spatial light modulation element 44; a dichroic prism 45; and a projection lens. The vision camera 47 includes: a pupil lens (eye lens) 47a; a magnifying lens 47b; and a CCD 47c. The screen 100 used in the present evaluation uses tracing paper for the semi-transmissive paper 12A and polyester film for the resin film 12B. The distance d between the laser light incident surface of the semi-transmissive diffusion layer 120 and the reflection scattering body 110 is 200 micrometers (μm).

The laser lights which exit the laser light sources 41R, 41G, 41B of RGB three colors are respectively guided to the rod integrator 42. The laser light is repeatedly internally reflected in the rod integrator 42 until reaching an exit end, and then passed through the illumination optical system 43 (relay lens, mirror 43a, field lens 43b, and the like), and projected on the spatial light modulation element 44 as a light beam having a rectangular cross section, in which a light intensity distribution is uniform. The spatial light modulation element 44 modulates the light beam and forms a two-dimensional image. The modulated laser light of RGB three colors is a wave combined by the dichroic prism 45, and it is projected onto the screen 100 by the projection lens 46 as a full color two-dimensional image.

The vision camera 47 includes the pupil lens 47a corresponding to the eye of a human, the magnifying lens 47b for enlarging the image generated on a virtual retina (which includes a speckle noise) on the CCD 47c, and the CCD 47c. Using the vision camera 47, the speckle noise contained in the image formed on the retina of the human is measured and evaluated based on the light receiving amount of a CCD 43.

In evaluation, only the green laser light is exited by the green laser light source 41G, a uniform image is displayed on the screen 100, and a ratio σ/X of an average value X of the light receiving amount in a CCD element that receives the light from the uniform image and a standard deviation σ of intensity variation of the uniform image caused by the speckle noise is used. As a comparative example, a case in which a general beads type screen is used in place of the screen 100 is shown.

Evaluation Result

The variation of first embodiment (Screen 100): σ/X=5.1%

The comparative example (beads type screen): σ/X=14.6%

The σ/X of the screen 100 of the variation of the first embodiment is reduced to that which is lower than or equal to the half of the σ/X of the comparative example, which shows that the effect of removing the speckle noise is exerted. In comparison with the comparative example, the screen 100 can provide a wider view angle. Although the screen 100 is a multi-layer configuration, generation of interference pattern noise and the like was not found. It is thus apparent that the laser image display screen according to the present invention has an excellent speckle noise removing characteristic.

The screen 10, 100 according to the present invention does not require a driving unit for driving the screen. Thus, it is advantageous in that it can be installed at any installing location, and can be used in screens of various sizes without consuming power and the like.

The laser image display device using the laser image display screen according to the present invention can display the image in which the speckle noise is reduced.

Second Embodiment

Figure 5:
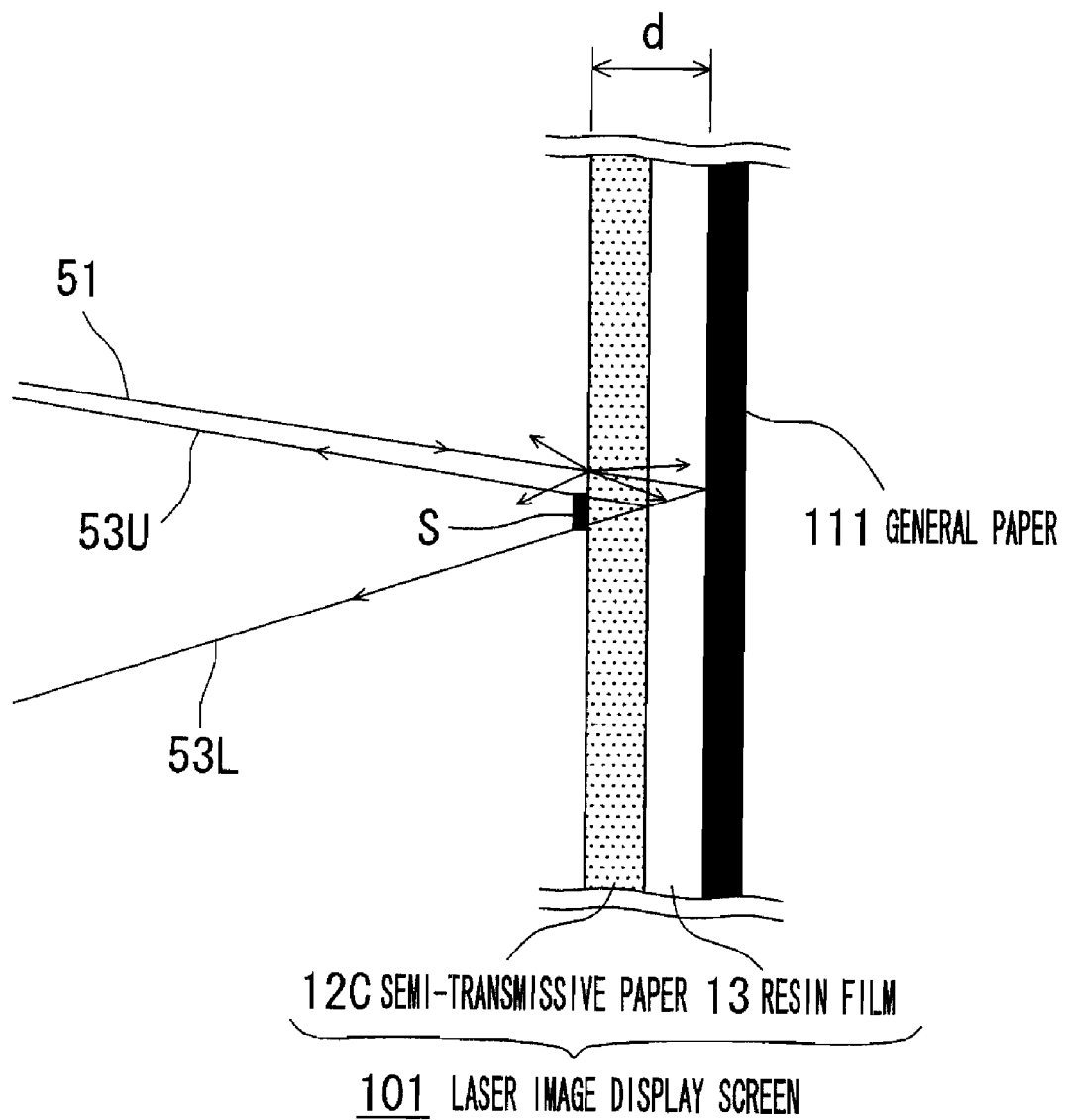
FIG. 5 is a partial cross sectional schematic view of a screen according to a second embodiment of the present invention.

FIG. 5 shows a partial cross sectional schematic view of a laser image display screen 101 according to a second embodiment of the present invention. In particular, the screen 101 is a laser image screen of a simplified structure that excels in terms of cost and is easy to carry. The screen 101 includes a semi-transmissive paper 12C as the semi-transmissive diffusion layer and a general paper 111 as a reflection scattering body, where a resin film 13 is inserted between the semi-transmissive diffusion layer and the reflection scattering body. The resin film 13 and the semi-transmissive paper 12C and general paper 111 are adhered with an adhesive so that surface reflection by the smooth surface of the resin film may not occur.

The semi-transmissive paper 12C uses material similar to the material used in the semi-transmissive diffusion layer described in the first embodiment.

The general paper 111 merely needs material having a scattering reflection effect with respect to the laser light used in image display, and a commonly used general paper can be used. Preferably, the general paper 111 does not contain fluorescent agent in order to obtain a vividly colorful image from the laser light source.

The screen 101 can be manufactured with a step similar to that of a so-called laminated paper, and thus is advantageous in terms of manufacturing cost. The material used in the manufacturing contains only material which is easily available, and thus can be manufactured very inexpensively and is advantageous in terms of cost. Texts and drawings can be drawn on the screen with a general writing material. The screen 101 is very light and is convenient to carry.

An example of the manufacturing of the screen 101 and the result of the evaluation measurement of the speckle noise reducing effect are shown. The screen 101 used in the evaluation measurement was made of tracing paper for the semi-transmissive paper 12C, polyester film having a thickness of 80 μm for the resin film 13, and a drawing paper for the general paper 111. The example 101 is similar to the screen 10, and the semi-transmissive paper 12C has a reflection effect and a diffusion effect with respect to the transmitted light, and the general paper 111 has a scattering reflection effect with respect to the incident light. A part of the incident light 51 is reflected by the semi-transmissive paper 12C, and the transmitted light is diffused and reaches the general paper 111. The general paper 111 scatters and reflects the transmitted light so as to again input the light into the semi-transmissive paper 12C and output the light from the microscopic area element S as substantially divergent light. Light 53U and 53L illustrates the light which exits from the microscopic area element S in a substantially diverging form. The distance d between the laser light incident surface of the semi-transmissive diffusion layer and the reflection scattering body in the present example was 150 micrometers. Similar to the first embodiment, the speckle noise of the screen 101 was evaluated and found to be σ/X=5.4%, and thus it says that the speckle noise is greatly reduced as compared to the comparative example.

Furthermore, the following two types of screen (first and second screens for comparing the distance d) were formed and the evaluation measurements were performed similar to the above to investigate the change in speckle noise removing effect due to difference in the distance d.

First screen for comparing distance d:

The screen was formed by attaching a thin diffusion resin film (thickness of 30 micrometers) having concave-convex pattern on the surface to the beads type screen. In this case, d=40 micrometers.

Result of evaluation measurement with respect to the first screen for comparing distance d:

As a result of performing the evaluation similar to the above using the laser image display device and the vision camera 47, σ/X=8.1% was obtained. The speckle noise was recognized to be reduced as compared to the screen (σ/X=14.6%) of the comparative example. However, the result of the evaluation measurement is not of the quality of the result for the previously described screen of the present invention. This shows that the obtained speckle noise reducing effect is relatively weak when the distance d is 40 micrometers, that is, when the above condition (d≧50 μm) is not met.

Second screen for comparing distance d:

A tracing paper was attached to an acrylic plate having a thickness of two millimeters, and the beads type screen was attached to the surface of the side opposite to the acrylic plate. In this case, d=2.1 millimeters.

Result of evaluation measurement with respect to second screen for comparing distance d:

As a result of the evaluation similar to the above using the laser image display device and the vision camera 47, σ/X=4.2% was obtained. The speckle noise was recognized to be reduced as compared to the screen (σ/X=14.6%) of the comparative example.

In addition, a test pattern image in which ON/OFF are repeated for every one pixel is measured using the vision camera. The luminance ratio of (luminance of OFF pixel)/(luminance of ON pixel) was less than 50%, and a degradation in image resolution was recognized. This shows that an image quality lowers when the distance d is 2.1 millimeters, that is, when the above condition (d≦2.0 mm) is not met.

Third Embodiment

A third embodiment of the present invention is a laser image display device which can be used with the screen of the previous embodiments of the present invention. FIG. 6 shows a configuration schematic diagram of the laser image display device according to the third embodiment. In FIG. 6, same reference numerals as in FIG. 4 are used for the components same as those of FIG. 4, and the description thereof will be omitted.

The laser image display device according to the present embodiment includes a rotary lenticular lens between the light source 41R and the like and the rod integrator 42. The lights which exit the laser light source 41R, 41G, 41B of RGB three colors are deflected by the rotary lenticular lens 51 and guided to the rod integrator 42. The rotary lenticular lens 51 is one mode of a light deflecting element having a function of deflecting the exit direction of the incident light.

Figure 7A:
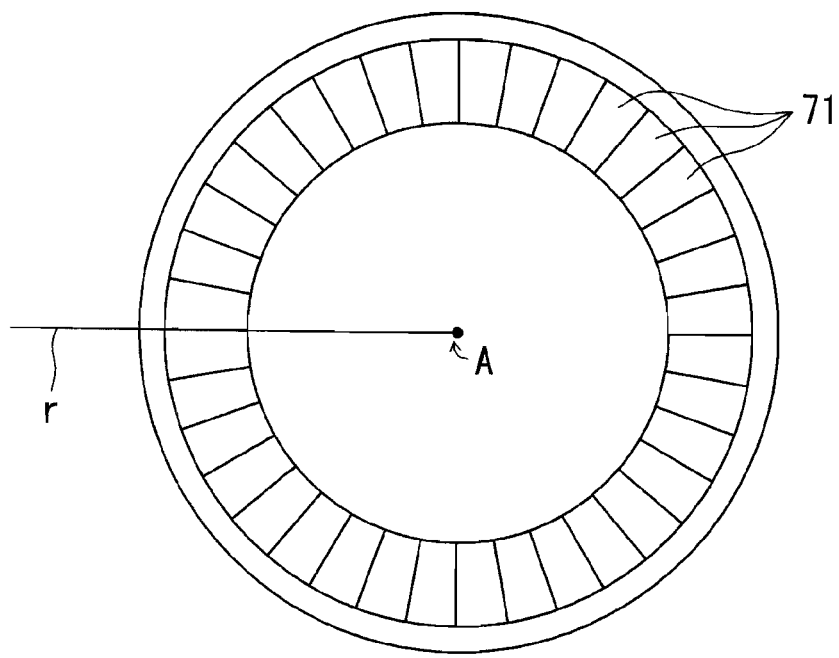
FIG. 7A is a plan view of a rotary lenticular lens.
Figure 7B:
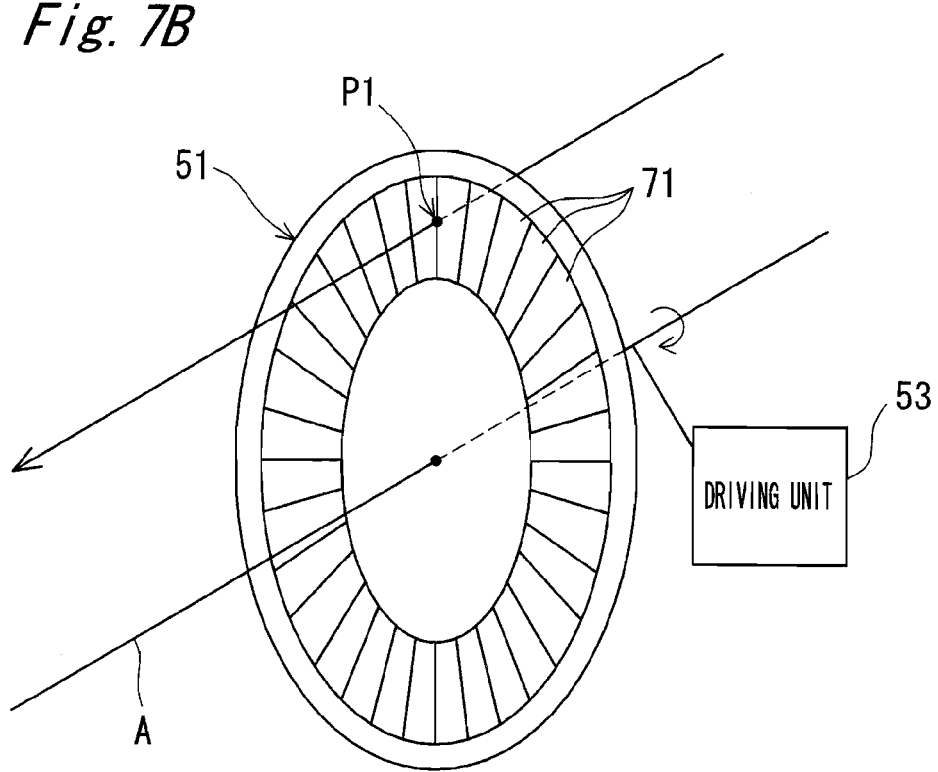
FIG. 7B is a perspective view of the operation of the rotary lenticular lens.

FIG. 7A is a plan view of the rotary lenticular lens 51. The rotary lenticular lens 51 includes a plurality of lenticular lens elements 71 in a circumferential direction, where each element 71 has a substantially uniform cross section in a direction parallel to a radial direction. FIG. 7B is a diagram of a driving unit 53 connected to the rotary lenticular lens 51. The driving unit 53 rotatably drives a rotation shaft A, and the rotary lenticular lens 51 also performs a rotating movement. Due to such rotation, the exit angle of the light entering the rod integrator at point P1 to temporally changes. Since a deflecting direction of the light temporally changes in the rotary lenticular lens 51, the incident angle of the light entering an arbitrary one pixel (cell) contained in the spatial modulation element 44 temporally changes. As a result, the incident angle of the light entering one region corresponding to the arbitrary one pixel on the screen 101 also temporally changes.

Similarly, the light reaching the observer from the screen 101 of the third embodiment temporally changes since the incident angle to the screen 101 temporally changes. The observer temporally integrates stimulation to the retina by the light that repeatedly changes temporally and recognizes the same. Thus, the effective light source area of the screen becomes larger as compared to when the angle is not changed. The effective light source area is further enlarged by using the screen 101 of the present invention using the semi-transmissive diffusion layer and the reflection scattering body. As a result, the speckle noise can be reduced to the level the observer cannot recognize it at all.

The amount of change in the irradiated angle seen from the screen is preferably greater than or equal to NA0.001 in terms of numerical aperture NA. If the NA is less than 0.01, the amount of change in the angle is small and no speckle noise reducing effect is obtained. More preferable amount of change in the angle is obtained to reduce the speckle noise to the level the observer cannot recognize it at all when the NA is greater than or equal to 0.002.

Using the vision camera similar to the previous embodiments with only the green laser light source 41G outputted, the green uniform image was displayed on the screen 101 and the evaluation was performed. The amount of change in the incident angle seen from the screen 101 of the third embodiment was NA0.003. In this case, σ/X=3.3%, and the speckle noise was substantially removed. The speckle noise was also visually evaluated but was not recognized.

The laser image display device of the present invention removes the speckle noise by arranging the screen 101 which includes the semi-transmissive diffusion layer and the reflection scattering body, and the driving unit 53 which controls the incident angle of the light entering the region corresponding to one pixel on the screen 101 such that the incident angle can be temporally changed. The rotation speed of the rotary lenticular lens 51 is set such that the deflection cycle is set to a speed the observer does not recognize the speckle noise. Specifically, the deflection angle is desirably changed at a speed of greater than or equal to 60 Hertz. However, the lower limit value may be changed depending on the content of the image to be displayed.

Figure 7C:
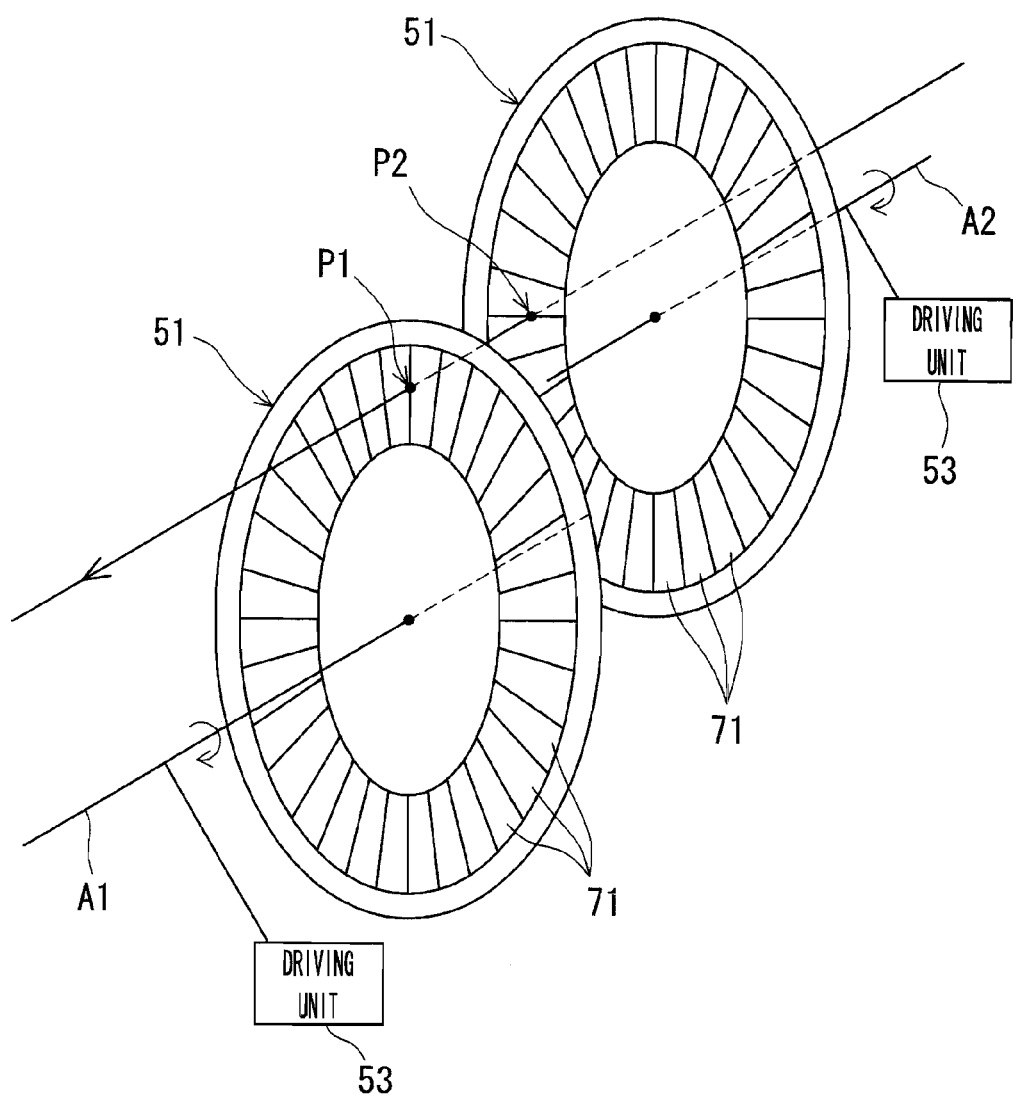
FIG. 7C is a perspective view of the operation of the rotary lenticular lens having two-piece configuration.

As shown in FIG. 7C, the configuration in which the rotary lenticular lens 51 is lined in series with respect to the laser light is also effective. In this case, the laser light enters the lenticular lens element 71 at point P1 and point P2. The laser light is deflected in the direction perpendicular to the plane of drawing at point P1, and deflected in a direction horizontal to the plane of drawing at point P2, and the deflecting directions are respectively temporally changed. The incident angle of the light entering each pixel of the spatial light modulation element 45 can be changed two-dimensionally in a complex manner by configuring the rotary lenticular lens 51 in such manner.

Figure 7D:
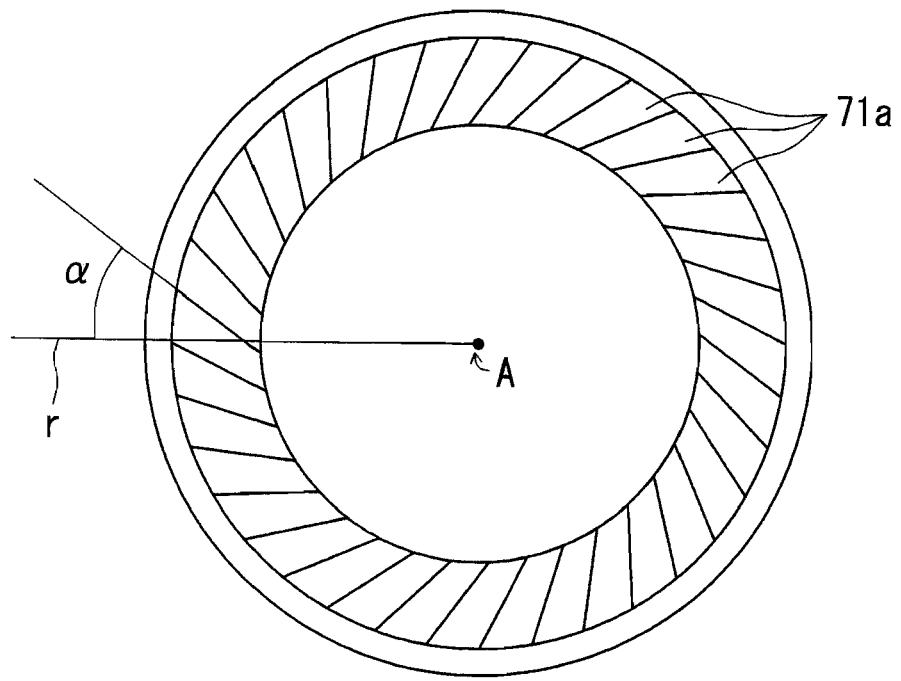
FIG. 7D is a plan view of a variation of the rotary lenticular lens.

In addition or instead, it is also advantageous to use a rotary lenticular lens variation 51a in which the lenticular lens element 71a is configured so as to form a predetermined angle α with respect to the radial direction, as shown in FIG. 7D. In the variation 51a, the direction of the temporal change of the deflecting direction of the light can be freely controlled by angle α.

In the third embodiment, the control is made so that the incident angle of the light entering the screen 101 by use of the rotary lenticular lens 51 is temporally changed, but other elements can be used as long as similar effect is obtained. Specifically, an element having a configuration of guiding the laser light to an optical fiber and vibrating the fiber, a configuration of moving the diffusion plate, mirror, and the like, may be used.

Fourth Embodiment

Figure 8:
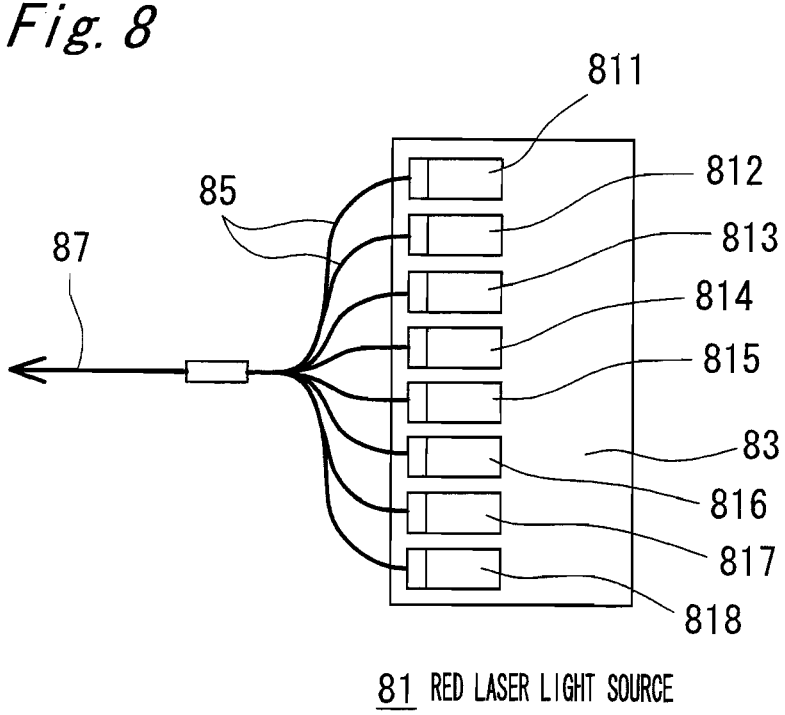
FIG. 8 is a configuration schematic diagram of a laser light source according to a fourth embodiment of the present invention.

A fourth embodiment of the present invention is a laser light source that can be used in the laser image display device of the present invention. FIG. 8 is a schematic diagram of a red laser light source 81 according to the present embodiment. The red laser light 81 includes laser diode (LD) chip array 83 with a plurality of laser diode (LD) chips 811 to 818, where the output light of the LD chips 811 to 818 are guided by fibers 85, which are coupled to a multimode fiber 87, and the laser light which exit the multimode fiber 87 is introduced to an optical system of the laser image display device. This figure shows the red laser light source by way of example, but is applicable to laser light sources of other colors.

A wavelength λ of the laser light outputted from the laser light source that outputs monochromatic light is represented using a center wavelength of the combined wave when the plurality of LD chips 811 to 818 are used. A half value width Δλ of the wavelength of the laser light is represented by the half value width of the combined laser light. The red laser light source 81 increases the Δλ as compared to when a single laser diode is used by using the plurality of LD chips 811 to 818.

Figure 9A:
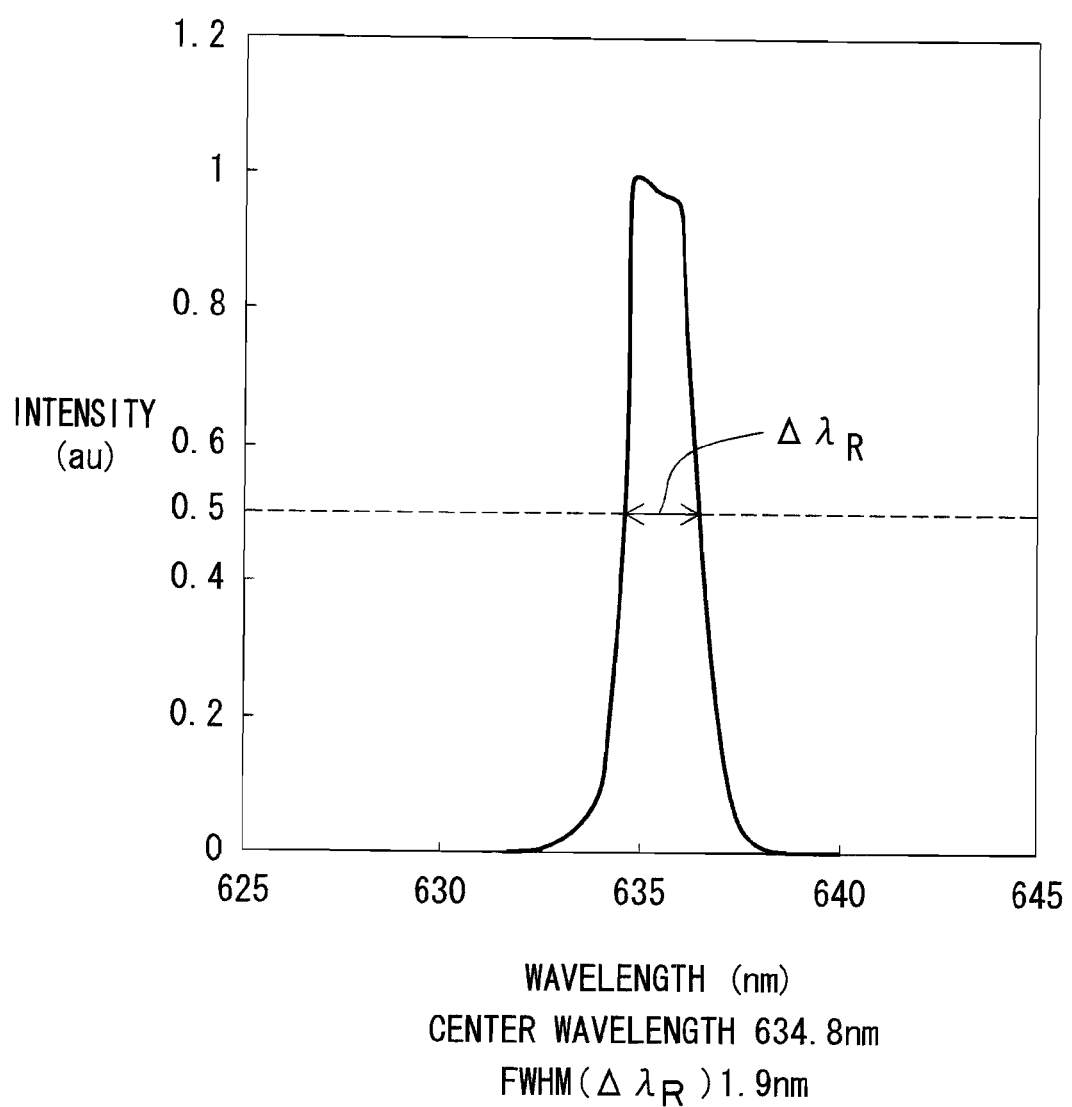
FIG. 9A is a characteristic diagram of a red laser light source according to the fourth embodiment of the present invention.

FIG. 9A is a characteristic diagram of the red laser light emitted by the red laser light source 81. Since the plural LD chips 811 to 818 are used, a broad peak appears in which a plurality of peaks is superimposed. Such laser light has a center wavelength of 634.8 nanometers, and a half value width DAR of 1.9 nanometers.

Figure 9B:
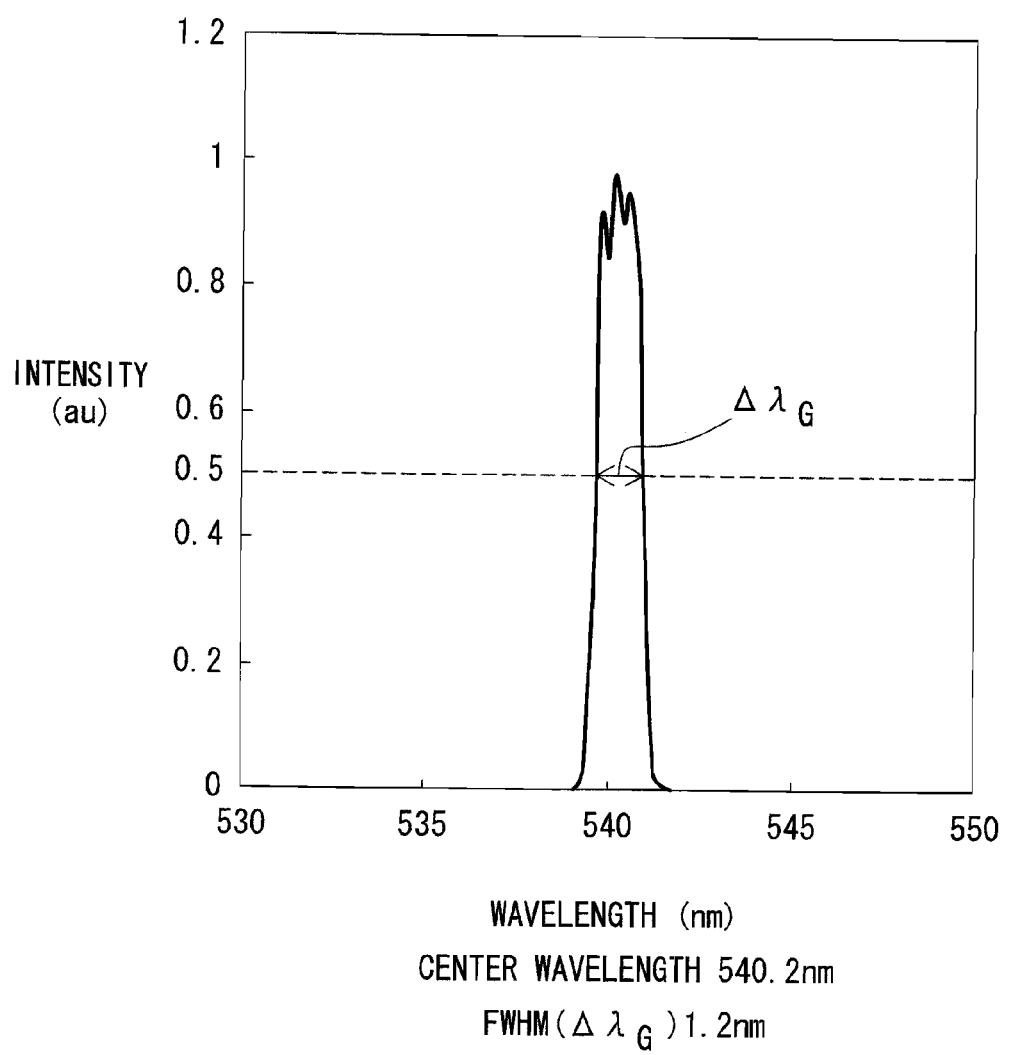
FIG. 9B is a characteristic diagram of a green laser light source according to the fourth embodiment of the present invention.

FIG. 9B is a characteristic diagram of a green laser light emitted by the green laser light that can be used in the laser image display device of the present invention. The green laser light source uses laser light emitted from a plurality of laser light sources as fundamental waves and converts the wavelength of the fundamental waves with one or more wavelength converting elements and combines the converted waves on the same axis using an appropriate optical system such as multimode fibers. The laser light has a center wavelength of 540.2 nanometers, and a half value width ΔλG of 1.2 nanometers.

Figure 9C:
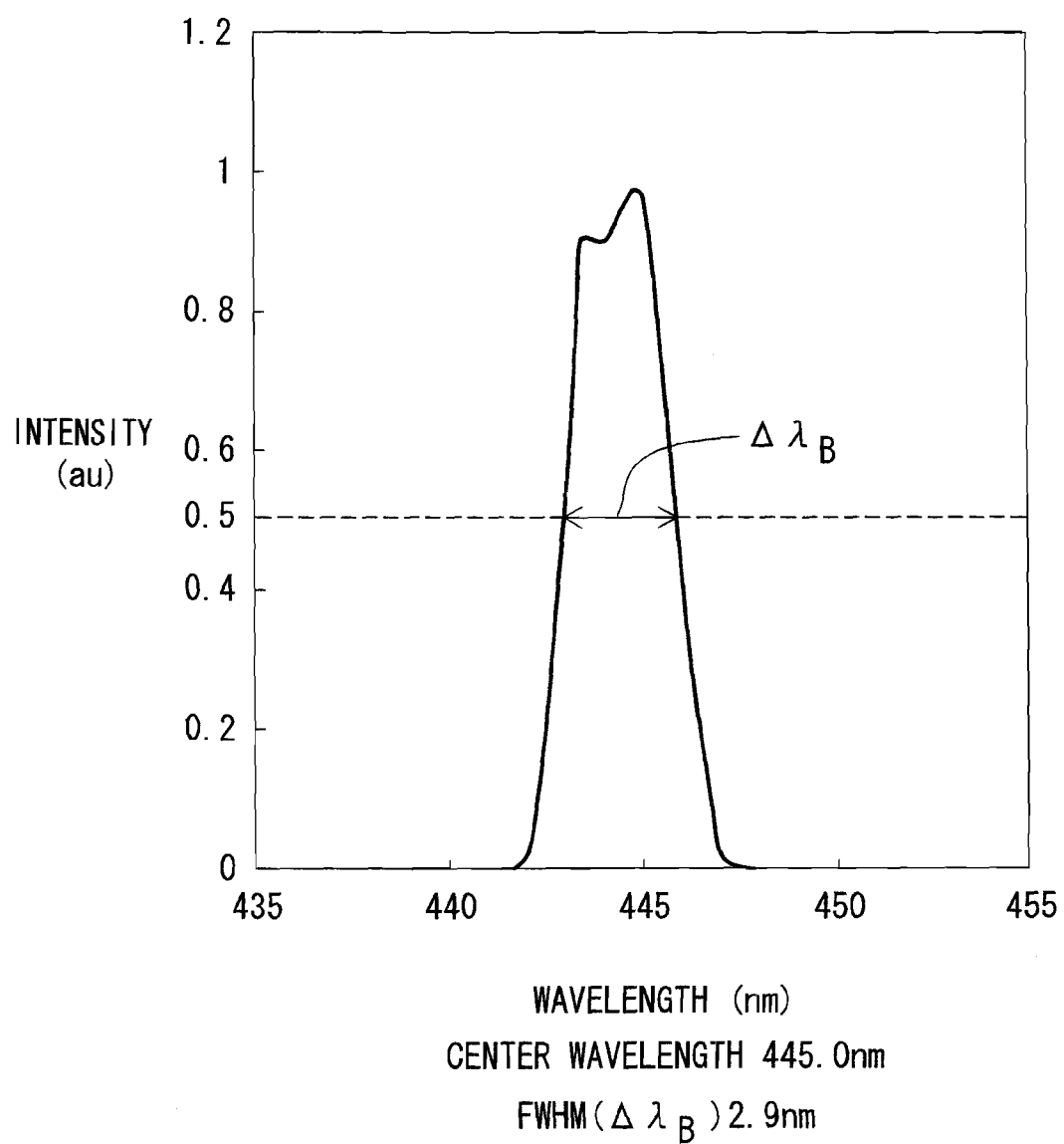
FIG. 9C is a characteristic diagram of a blue laser light source according to the fourth embodiment of the present invention.

FIG. 9C is a characteristic diagram of blue laser light emitted by the blue laser light source that can be used in the laser image display device of the present invention. The blue laser light source has a configuration similar to the red laser light source 81 of FIG. 8. In this light source, the laser diode which emits laser light of blue region is used. The laser light has a center wavelength of 445.0 nanometers, and a half value width ΔλB of 2.9 nanometers.

A relationship of the distance d between the light incident surface of the semi-transmissive diffusion layer and the reflection scattering body described in the previous embodiment and the half value width Δλ is $$2d \times \Delta\lambda > \lambda^2$$

where interference between the light reflected towards the observer side by the semi-transmissive diffusion layer and the light reflected by the reflection scattering body can be eliminated and the speckle noise can be removed. Here, Δλ is one of ΔλR, ΔλG, and ΔλB.

Similar to the previous evaluation measurement, only the red laser light was outputted from the red laser light source 81, red uniform image was displayed on the screen 101, and evaluation of σ/X was performed to evaluate the speckle noise. In the present evaluation measurement, the screen 101 having a distance d=150 μm was used. The result of the evaluation measurement was σ/X=3.5%. It is apparent that this result is better than that with respect to the green laser light 51G (center wavelength 540 nm, half value width 0.1 nm) in speckle noise reducing effect. Thus, it can be recognized that the red laser light source 81 be effective in reducing the speckle noise. The speckle noise was also visually evaluated, but was not recognized.

The laser image display device of the present invention removes the speckle noise by having a relationship of the distance d between the light incident surface of the semi-transmissive diffusion layer and the reflection scattering body, the wavelength of the laser light source and the half value width as $2d \times \Delta\lambda > \lambda^2$.

When the half value width of the wavelength of the laser light from the laser light source is magnified using multi-laser and multimode laser of FIG. 8, it is preferable that the half value width Δλ of at least one color may be greater than or equal to 0.5 nanometer (Δλ≧0.5 nm), and it is more preferable that the half vale width may be greater than or equal to one nanometer (Δλ≧1 nm). In addition, it is preferable that the half value width may be less than 10 nanometers (Δλ<10 nm) to maintain an efficiency and a color purity of the laser oscillation.

In the laser image display device, the light sources of three colors of RGB or more colors are used, but the above relationship merely needs to be satisfied for at least one or more color, but more preferably, the above relationship is satisfied for all the colors.

In the fourth embodiment, the half value width Δλ of the light is increased using the plurality of LD chips in the laser light source, but in addition, methods of increasing the Δλ which uses a pulse oscillation or a multimode laser may be used. The above relationship can be satisfied even if Δλ is small by increasing d within a range wherein the out of focus of the image quality can be tolerated.

The laser light source of the present invention merely may be a light source using laser oscillation, and SHG laser or the like obtained by wave converting the semiconductor laser, gas laser, solid laser, and the like may be used.

In the laser image display device of the present invention, the integrator, the illumination optical system, the modulation element, and the projection optical system are not particularly limited to those described Optical elements for image display may be appropriately used.

The laser image display screen and the laser image display device of the present invention can be used to display moving pictures and still pictures.

The laser image display device of the present invention has been explained using the case where RGB three colors are used, but the device may be a display device of a single color. The description is also made using a two-dimensional spatial modulation element but is also applicable to the laser image display device for forming the image by scanning one-dimensional modulation element and laser light.

The invention claimed is:

1. A laser image display screen for projecting laser light having a center wavelength λ and a half value width Δλ, said laser image display screen comprising:
    a reflection scattering body that scatters and reflects the laser light, said reflection scattering body having a concave-convex shape; and
    a semi-transmissive diffusion layer that is arranged substantially parallel to the reflection scattering body, wherein:
    the semi-transmissive diffusion layer reflects at least 20% or more of the laser light, and transmits the remaining laser light, and diffuses and outputs the transmitting laser light; and
    a relationship of a distance d between a boundary on a side opposite to the reflection scattering body of the semi-transmissive diffusion layer and the reflection scattering body, the center wavelength λ, and the half value width Δλ satisfies $2d \times \Delta\lambda > \lambda^2$.

2. The laser image display screen according to claim 1, wherein the semi-transmissive diffusion layer includes paper material.

3. The laser image display screen according to claim 1, further comprising resin film between said semi-transmissive diffusion layer and said reflection scattering body or in said semi-transmissive diffusion layer, wherein
    said resin film maintains a distance of a space between an observer side boundary of said semi-transmissive diffusion layer and said reflection scattering body constant.

4. The laser image display screen according to claim 1, wherein:
    a transmissivity of said semi-transmissive diffusion layer is greater than or equal to 10%; and a reflectivity of said semi-transmissive diffusion layer is greater than or equal to 10%.

5. A laser image display device comprising a laser light source that emits a laser light and a laser image display screen that projecting the laser light, wherein said laser image display screen includes:

a reflection scattering body that scatters and reflects the laser light, said reflection scattering body having a concave-convex shape; and a semi-transmissive diffusion layer that is arranged substantially parallel to said reflection scattering body, and wherein:

said semi-transmissive diffusion layer reflects at least 20% or more of the laser light, and transmits the remaining laser light, and diffuses and outputs the transmitting laser light; and a relationship of a distance d between a boundary on a side opposite to the reflection scattering body of the semi-transmissive diffusion layer and the reflection scattering body, a center wavelength $\lambda$ of the laser light emitted by said laser light source, and a half value width $\Delta\lambda$ of the laser light satisfies $2d \times \Delta\lambda > \lambda^2$.

6. The laser image display device according to claim 5, further comprising a light deflecting element that receives the laser light and outputs the laser light while deflecting an advancing direction, wherein said light deflecting element is arranged between said laser light source and said laser image display screen.

* * * * *